(No Model.)
H. WILKENS.
CHIP VAT.
No. 309,906. Patented Dec. 30, 1884.
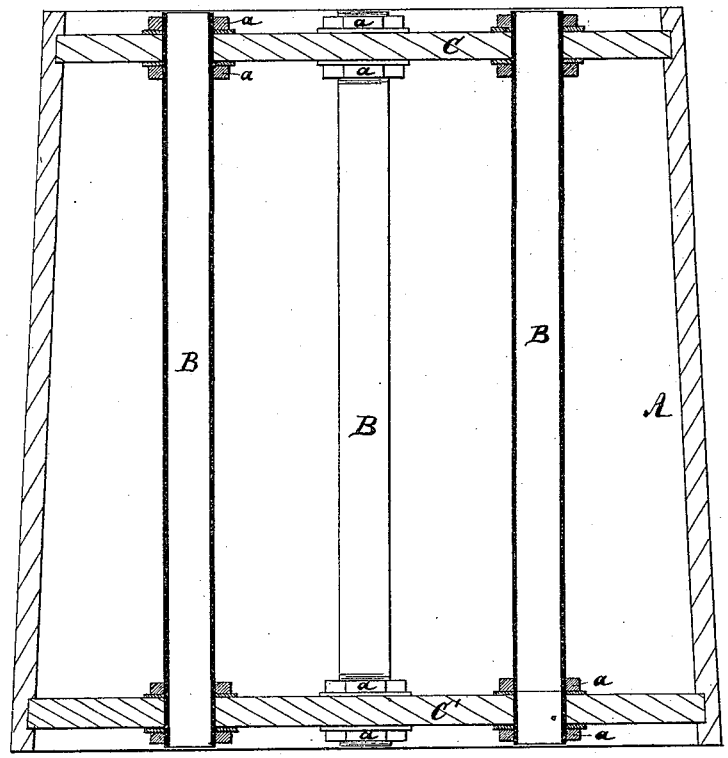
WITNESSES:
INVENTOR
BY
ATTORNEY

UNITED STATES PATENT OFFICE.

HENRY WILKENS, OF NEW YORK, N. Y.

CHIP-VAT.

SPECIFICATION forming part of Letters Patent No. 309,906, dated December 30, 1884.

Application filed October 13, 1884. (No model.)

*To all whom it may concern:*

Be it known that I, HENRY WILKENS, a citizen of the United States, residing at New York, in the State of New York, have invented a new and useful Improvement in Chip-Vats, of which the following is a specification.

The beer, just before being filled into small barrels, is put into chip-vats, and finings or precipitating agents added to give a final cleansing to the beer, after which the same is forced by means of atmospheric pressure introduced into the chip-vat into the small barrels. During this process a slight fermentation takes place, producing a rise of temperature, which is difficult to reduce by the surrounding cold.

On account of the great size of these chip-vats (from one hundred and fifty to two hundred barrels) and the necessary strength of the heads to withstand the atmospheric pressure forced into the vat for the purpose of discharging the beer, the heads of these vats must be secured by strong stay-bolts.

My improvement consists in substituting tubes or pipes for these stay-bolts, through which the surrounding cold air may circulate, or through which cooling-pipes may be made to pass, for the purpose of cooling the beer in the chip-vat or prevent any rise of temperature during this cleansing operation.

In the accompanying drawing, representing a section of a chip-vat, A is the vat, and B B tubes or pipes, secured by internal and external nuts, *a*, to the heads C C' of the vat, forming the required stay-bolts for these heads. Suitable pipes are arranged in the usual manner (not shown in the drawing) to introduce the liquid into the vat, as well as a cock or pipe at the bottom to withdraw the same from the vat, together with the necessary connections to force the pressure into the vat, whereby the liquid is to be forced out. The cold air of the room or chamber can thus pass freely through these pipes, or cooling-tubes may be arranged to pass through the same to cool the beer in the vat and prevent any detrimental rise of temperature during this final cleansing operation.

What I claim as my invention, and desire to secure by Letters Patent, is—

In a chip-vat, the combination of tubes B B, with the heads C C' of the vat securely attached to said heads, and forming the required stay-bolts, substantially as and for the purpose set forth.

HENRY WILKENS.

Witnesses:
HENRY E. ROEDER,
J. B. NONES.